United States Patent
Ichikawa

(10) Patent No.: US 8,159,684 B2
(45) Date of Patent: Apr. 17, 2012

(54) IMAGE PROCESSING APPARATUS, IMAGE PROCESSING METHOD, AND COMPUTER PROGRAM PRODUCT EACH TO PROCESS A PLURALITY OF PRINTER LANGUAGES

(75) Inventor: Mikiya Ichikawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1632 days.

(21) Appl. No.: 11/511,268

(22) Filed: Aug. 29, 2006

(65) Prior Publication Data

US 2007/0064255 A1 Mar. 22, 2007

(30) Foreign Application Priority Data

Sep. 16, 2005 (JP) .................................. 2005-271055

(51) Int. Cl.
*G06F 3/12* (2006.01)
*H04N 1/00* (2006.01)

(52) U.S. Cl. ........................... 358/1.1; 358/1.6; 358/1.13

(58) Field of Classification Search .................... 358/1.1, 358/1.6, 1.13
See application file for complete search history.

(56) References Cited

U.S. PATENT DOCUMENTS

| 7,375,833 | B2 | 5/2008 | Miyata | |
|---|---|---|---|---|
| 2004/0190010 | A1* | 9/2004 | Miyata | 358/1.1 |
| 2006/0033940 | A1* | 2/2006 | Miyata et al. | 358/1.9 |

FOREIGN PATENT DOCUMENTS

| JP | 2002-24840 | 1/2002 |
|---|---|---|
| JP | 2003-177889 | 6/2003 |
| JP | 2003-271948 | 9/2003 |
| JP | 2003-283855 | 10/2003 |
| JP | 2004-185106 | 7/2004 |
| JP | 2004-303077 | 10/2004 |

OTHER PUBLICATIONS

Japanese Office Action dated Aug. 17, 2010 for Japanese Application No. 2005-271055.

* cited by examiner

*Primary Examiner* — Thomas Lett

(74) *Attorney, Agent, or Firm* — Harness, Dickey & Pierce, P.L.C.

(57) ABSTRACT

An image processing apparatus can process a plurality of printer languages having respectively different ROP calculation rules, and inputs a drawing command written in any one of the printer languages and performs rasterization into drawing data corresponding to the drawing command. An interpreter converts a target ROP code and ROP calculation rule of the print data into another ROP code and ROP calculation rule that produce substantially the same drawing data.

8 Claims, 7 Drawing Sheets

IMAGE PROCESSING APPARATUS, IMAGE PROCESSING METHOD, AND COMPUTER PROGRAM PRODUCT EACH TO PROCESS A PLURALITY OF PRINTER LANGUAGES

CROSS-REFERENCE TO RELATED APPLICATIONS

The present document incorporates by reference the entire contents of Japanese priority document, 2005-271055 filed in Japan on Sep. 16, 2005.

BACKGROUND OF THE INVENTION

1. Field of the Invention

The present invention relates to an image processing apparatus, an image processing method, and an image processing program, and, more particularly to an image processing apparatus, an image processing method, and an image processing program that can process a plurality of printer languages having respectively different Raster Operation (ROP) calculation rules, and that input print data written in any one of the printer languages and perform rasterization into drawing data corresponding to the print data.

2. Description of the Related Art

Various manufacturers determine their own printer languages, including Post Script (PS), Printer Control Language (PCL), Refined Printing Command Stream (RPCS), and the like. Generally, drivers of a personal computer (PC) or print processors of printer controllers are respectively provided for each printer language.

In an environment with relatively limited resources (in a printer controller, for example), it is efficient if one processor can support a plurality of printer languages. There are many printers that can correspond to ROP3 supported by Graphics Device Interface (GDI) in Windows (registered trademark). For example, Japanese Patent Application Laid-Open No. 2003-283855 proposes an image processing apparatus that can accurately perform an ROP process on print data and generate the print data at high speed without damaging the color.

Summary of the Invention

It is an object of the present invention to at least partially solve the problems in the conventional technology.

According to an aspect of the present invention, an image processing apparatus that can process a plurality of printer languages having respectively different raster operation (ROP) calculation rules, and receiving print data written in any one of the printer languages and performs rasterization into drawing data corresponding to the input print data includes a converter that converts a target ROP code and ROP calculation rule of the print data into another ROP code and ROP calculation rule that produce substantially same drawing data.

According to another aspect of the present invention, an image processing method of processing a plurality of printer languages having respectively different raster operation (ROP) calculation rules, and receives print data written in any one of the printer languages and performs rasterization into drawing data corresponding to the input print data includes converting a target ROP code and ROP calculation rule of the print data into another ROP code and ROP calculation rule that produce substantially same drawing data.

According to still another aspect of the present invention, a computer program product executable by a computer and having a computer-readable recording medium including a plurality of instructions for for processing a plurality of printer languages having respectively different ROP calculation rules, inputting print data written in any one of the printer languages, and performing rasterization into drawing data corresponding to the input print data, the instructions causing the computer to execute converting a target ROP code and ROP calculation rule of the print data into another ROP code and ROP calculation rule that produce substantially same drawing data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image processing apparatus, an image processing method, and an image processing program according to the present invention will be explained in detail below with reference to the accompanying drawings. Note that the present invention is not limited by the embodiments. Constituent elements in the embodiments include those that can be easily assumed by those skilled in the art or that are substantially equivalent.

Figure 1:
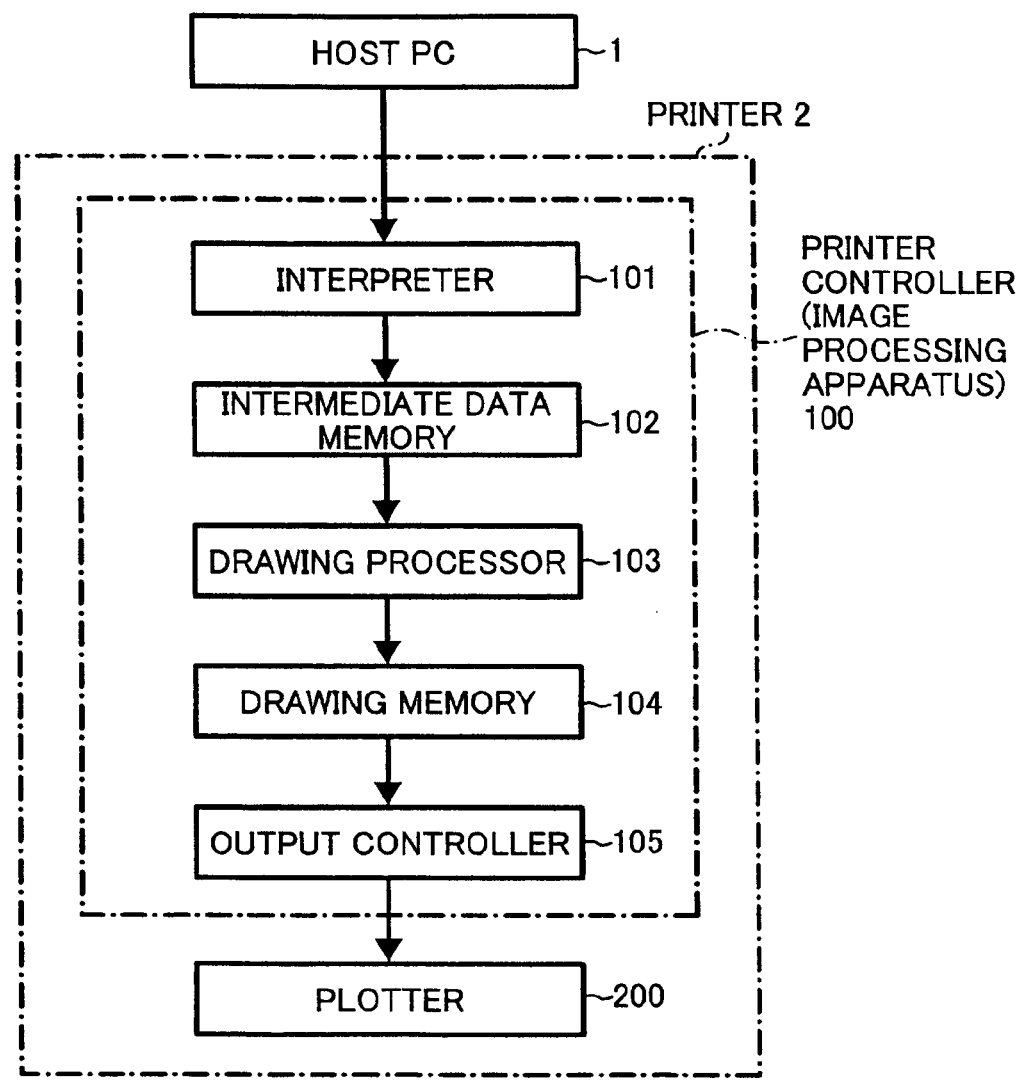
FIG. 1 is a configuration example of an image processing system according to a first embodiment of the present invention.

FIG. 1 is a configuration example of an image processing system according to a first embodiment of the present invention. As shown in FIG. 1, the image processing system according to the first embodiment includes a host PC 1, which is an information processing apparatus, and a printer 2, which is an image forming apparatus. The host PC 1 and the printer 2 are connected by a cable, or a network such as a local area network (LAN) for establishing communications therebetween. The host PC 1 has a plurality of printer drivers each of which corresponds to a plurality of printer languages (for example, RPCS, CDC, PCL, PS, and the like). The host PC 1 uses a desired printer driver for converting document data into print data made up of a plurality of drawing commands, and transmits the print data to the printer 2. These drawing commands include various kinds of commands such as a text command, a graphics command, and an image command. Each command has its own characteristic.

The printer 2 rasterizes the print data into drawing data corresponding to the print data input from the host PC 1, and outputs the printing. The printer 2 includes a printer controller 100, which is an image processing apparatus, and a plotter 200 that prints the drawing data on a piece of paper by using an electrophotographic system, an inkjet system, or the like.

The printer controller 100 includes an interpreter 101, an intermediate data memory 102, a drawing processor 103, a drawing memory 104, and an output controller 105. The printer controller 100 is configured so as to be able to process a plurality of printer languages (for example, RPCS, CDC, PCL, PS, and the like).

The interpreter 101 receives the print data sent from the host PC 1, and interprets the print data so as to generate intermediate data. When a target ROP code and ROP calculation rule are included in the print data, the interpreter 101 converts them into another ROP code and ROP calculation rule as explained later.

The intermediate data memory 102 stores the intermediate data generated by the interpreter 101.

The drawing processor 103 reads out the intermediate data from the intermediate data memory 102, rasterizes the intermediate data so as to generate drawing data (bitmap image), and writes the resultant data into the drawing memory 104. When an ROP process is instructed to the drawing processor 103 by a drawing command (intermediate data), the drawing processor 103 executes the instructed ROP process. In this case, when the ROP code and the ROP calculation rule are converted in the interpreter 101, the ROP process is executed using the converted ROP code and ROP calculation rule. In the drawing processor 103, when a color depth of the plotter 200 is smaller than that of the print data, a color process such as a dithering is essential. The dithering will be used herein.

The drawing memory 104 holds the drawing data (bitmap image) developed by the drawing processor 103. The output controller 105 reads out the drawing data (bitmap image) developed by the drawing memory 104, and transfers the drawing data to the plotter 200 so as to form an image.

Figure 2:
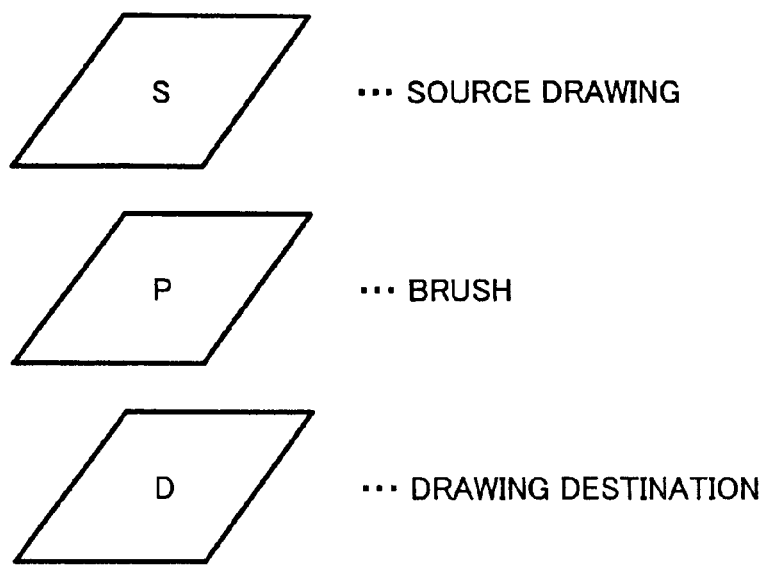
FIG. 2 is an explanatory diagram of ROP calculation rules of ROP3.

The ROP process according to the present embodiment will be explained next. The ROP is a logical calculation process performed when two or more drawing objects (raster images) are overlaid. By executing the ROP process, it is possible not only to write one drawing object over another drawing object in a simple hierarchical order, but also to apply various image effects such as "watermarking", and "inversion". The GDI in Windows (registered trademark) supports ROP commands such as ROP2 and ROP3. The ROP2 performs logical calculations of two objects, that is, a source (target image to be newly written) and a destination (original image, i.e., image that has already been written). The ROP3 performs logical calculations of three objects, that is, a source (target image to be newly written), a pattern, and a destination (original image, i.e., image that has already been written), as shown in FIG. 2. Under these commands, logical calculation processes such as AND, OR, NOT, and XOR are performed on each object, and the results are written into the destination. From a combination of states and output results of each drawing object, 16 types of logical calculations in the ROP2, and 256 types of logical calculations in the ROP3 can be processed. Hereinafter, the ROP3 will be explained.

Generally, the ROP calculation rule is determined by each printer language, and thus, this rule is not switched during printing. In the printer controller 100 of the present embodiment, however, the ROP calculation rule is switched during printing.

Figure 3:
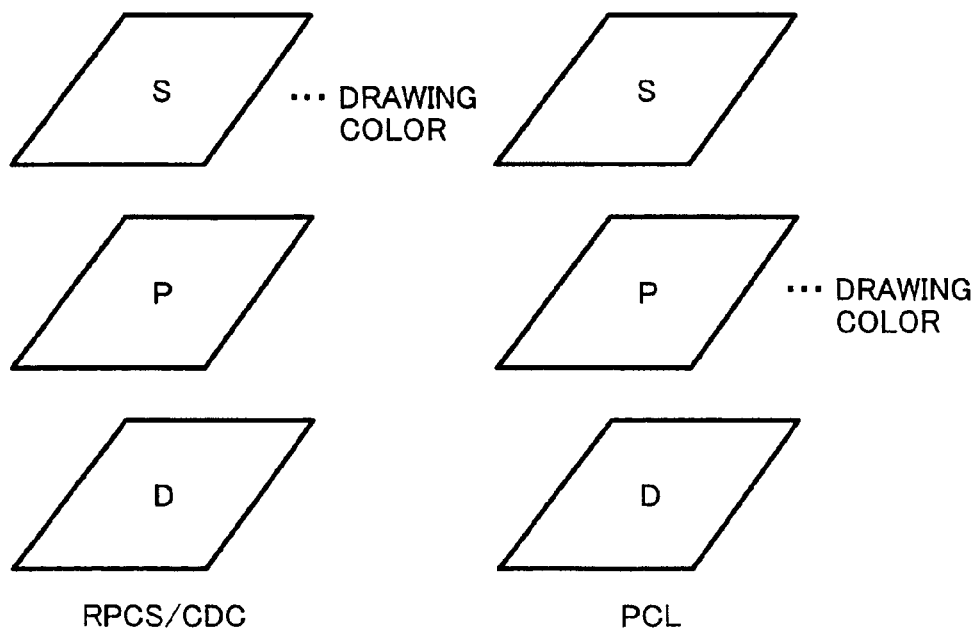
FIG. 3 is an explanatory diagram of the ROP calculation rules of PRCS/CDC and PCL.

FIG. 3 is an explanatory diagram of the ROP calculation rules of PRCS/CDC and PCL. In the ROP3, the ROP calculation is performed by using three planes of the source, the pattern, and the destination, as explained above. For example, as shown in FIG. 3, a drawing color of a graphics drawing (dither) is applied to the source in the RPCS/CDC. On the other hand, the drawing color is applied to a brush in the PCL, thus a different ROP calculation is used.

By switching the application of the drawing color between the source and the pattern, the ROP calculation rule can correspond to the both printer languages (PRCS/CDC and PCL). In some ROP calculation rules, when there are different ROP codes that produce the same result, if there are ROP codes that produce the same drawing result and yet have a difference in drawing process time, it becomes faster if the ROP code with a shorter process time is selected.

Figure 4:
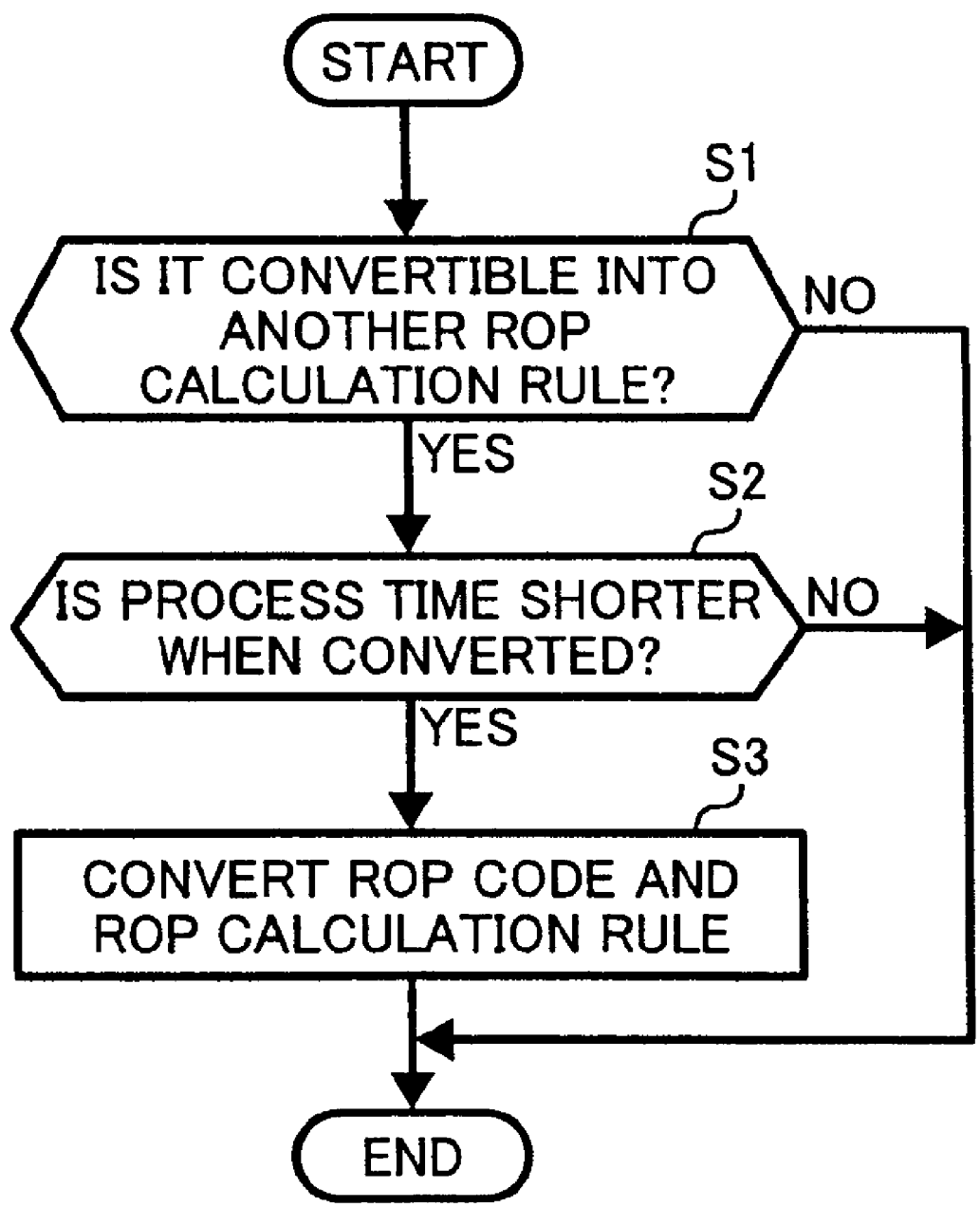
FIG. 4 is a flowchart for explaining a process for converting an ROP code and the ROP calculation rule in an interpreter.

FIG. 4 is a flowchart for explaining a process for converting the ROP code and the ROP calculation rule in the interpreter 101. In FIG. 4, the interpreter 101 determines whether it is possible to convert the ROP code and the ROP calculation rule of the print data into another ROP code and ROP calculation rule (step S1). When it is possible to convert into another ROP code and ROP calculation rule (step S1: Yes), the interpreter 101 determines whether a process time can be shortened when the conversion is performed (step S2). When the process time can be shortened by performing the conversion (step S2: Yes), the interpreter 101 converts another ROP code and ROP calculation rule (step S3).

For example, in RPCS/CDC as shown in FIG. 3 above, since the drawing color of the graphics drawing is applied to the source drawing, a ROP code of "0xCC" produces a drawing result such that brushes are paved in a drawing range of the source drawing. On the contrary, in PCL, since the drawing color is applied to the brush, a similar result is produced by a ROP code of "0xF0" or "0xFC".

For example, upon receipt of a drawing command in which the ROP calculation rule is PCL and the ROP code is "0xFC", if process can be performed faster by drawing in which the ROP calculation rule is RPCS and the ROP code is "0xCC", the interpreter 101 converts the ROP calculation rule into RPCS, and the ROP code into "0xCC".

Figure 5A:
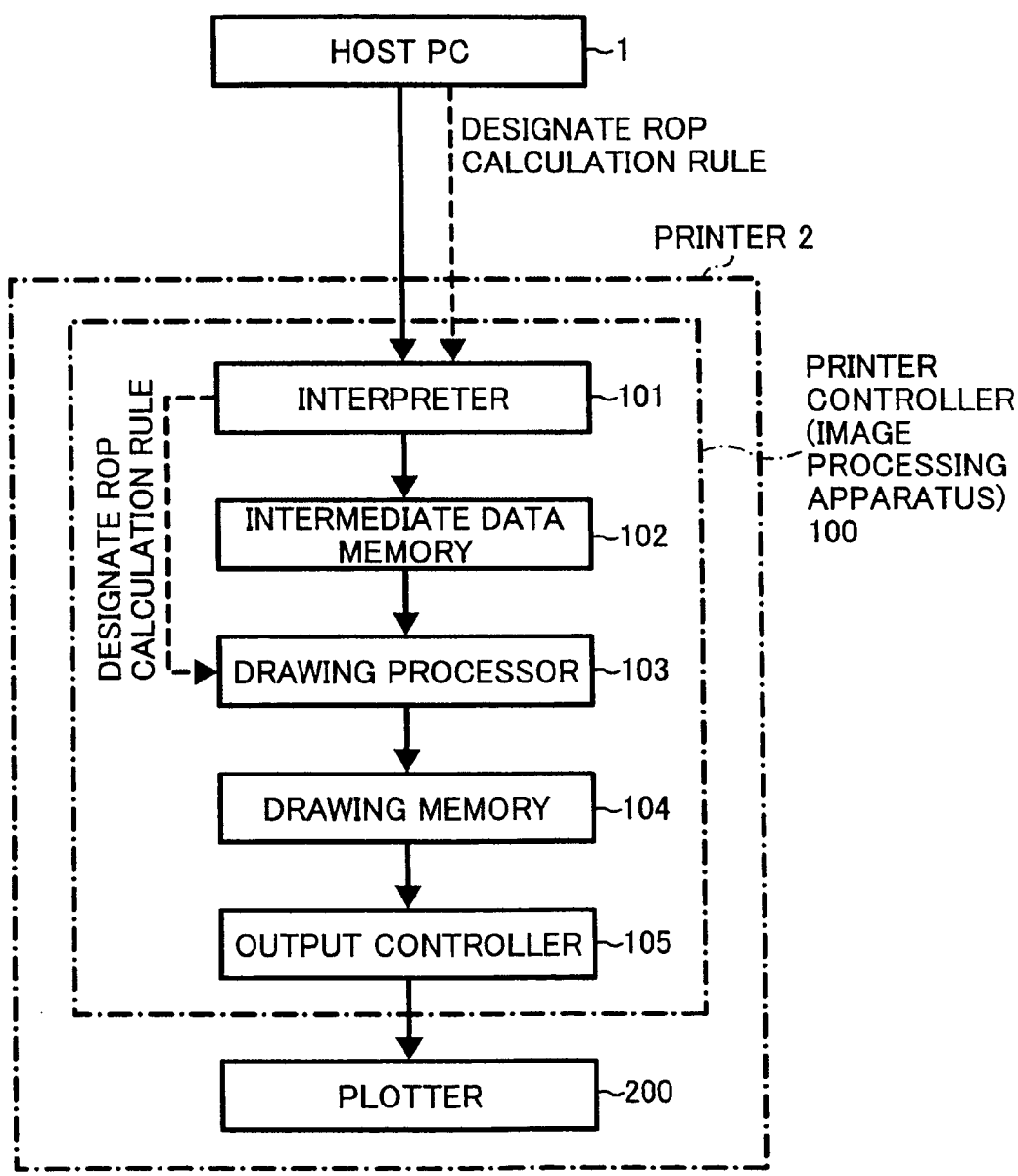
FIG. 5A is an explanatory diagram of an instruction method for changing the ROP calculation rule (part 1)
Figure 5B:
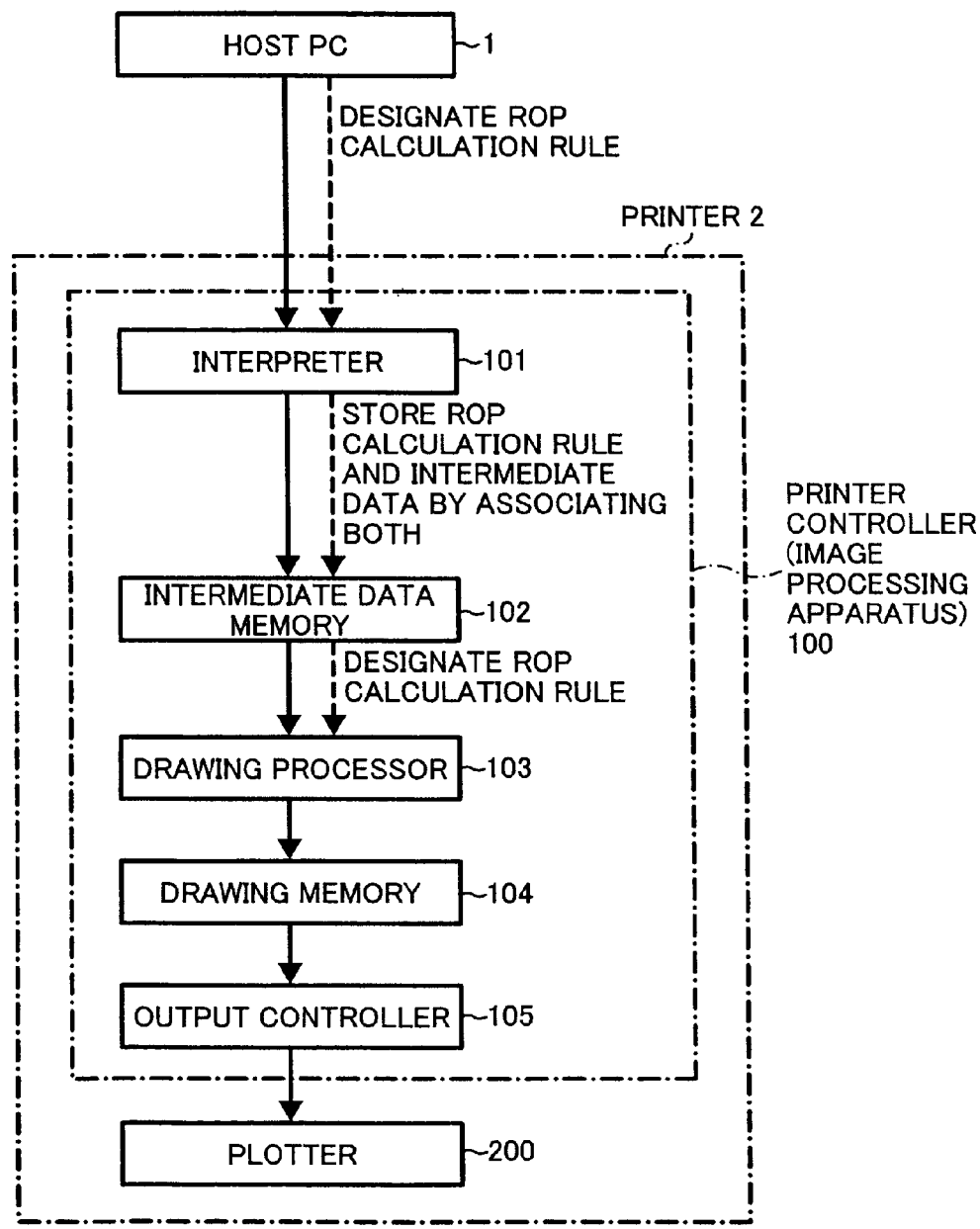
FIG. 5B is an explanatory diagram of the instruction method for changing the ROP calculation rule (part 2)

FIGS. 5A and 5B are explanatory diagrams of an instruction method of the ROP calculation rule. For example, the interpreter 101 instructs the ROP calculation rule to the drawing processor 103, as shown in FIG. 5A. The drawing processor 103 performs the drawing to the drawing memory 104 according to the ROP calculation rule instructed by the interpreter 101. As shown in FIG. 5B, the interpreter 101 correlates the intermediate data and the ROP calculation rule by each drawing command, by each band, by each page, or by each job, and stores the same in the intermediate data memory 102. The drawing processor 103 performs the drawing to the drawing memory 104 according to the ROP calculation rule stored in the intermediate data memory 102.

As explained above, according to the first embodiment, since the target ROP code and the ROP calculation rule are converted into another ROP code and ROP calculation rule that produce substantially the same drawing data and can shorten the speed of the ROP process, the ROP process can be performed at high speed if a plurality of printer languages can be processed.

Figure 6:
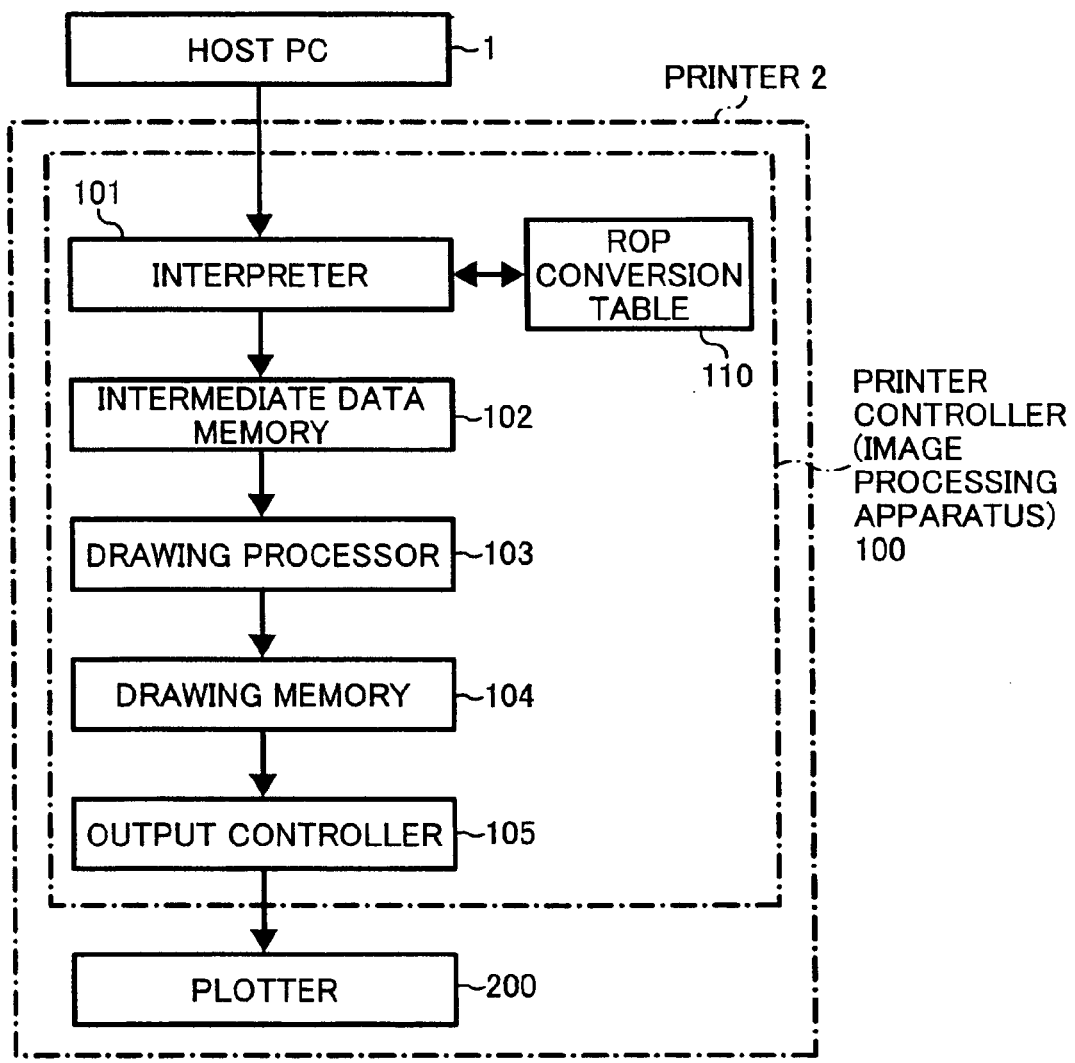
FIG. 6 is a configuration example of an image processing system according to a second embodiment of the present invention.

FIG. 6 is a configuration example of an image processing system according to a second embodiment of the present invention. In FIG. 6, like reference numerals denote like parts having equivalent functions as those shown in FIG. 1. Explanations of the common parts are omitted, and only different parts are explained.

In the printer controller 100 according to the second embodiment, when an ROP code and an ROP calculation rule are converted, the interpreter 101 refers to a ROP conversion table 110 so as to perform the conversion. The ROP conversion table 110 uses at least the ROP code, the ROP rule, and types of drawing objects (image, graphics, and the like) as parameters.

The ROP conversion table 110 stores the ROP code and the ROP calculation rule to be converted, and a conversion-processed ROP code and ROP calculation rule in association with each other. The stored ROP code and ROP calculation rule to be converted are convertible into another ROP code and ROP calculation rule (substantially the same drawing results are generated), and are advantageous in processing speed (processing speed is fast) when converted. The interpreter 101 refers to the ROP conversion table 110 so as to determine whether the ROP code and the ROP calculation rule to be input from the host PC 1 are stored as subject to conversion. When such code and rule are stored, the interpreter 101 converts them into the conversion-processed ROP code and ROP calculation rule. When the ROP code and the ROP calculation rule received from the host PC 1 are not stored as subject to conversion on the ROP conversion table 110, the interpreter 101 does not perform the conversion.

For example, when a graphics drawing in which the ROP calculation rule is PCL and the ROP code is "0xB8" is performed, since the graphics drawing has no background drawing area on a source plane and has only a foreground portion therein, the simplest conversion is that the ROP calculation rule is RPCS and the ROP code is "0xCC". With this, when the process speed is faster if the ROP calculation rule is RPCS and the ROP code is "0xCC", the ROP conversion table 110 is configured such that the ROP calculation rule of PCL is converted into the ROP calculation rule of RPCS, and the ROP code of "0xB8" is converted into the ROP code of "0xCC", respectively.

Figure 7:
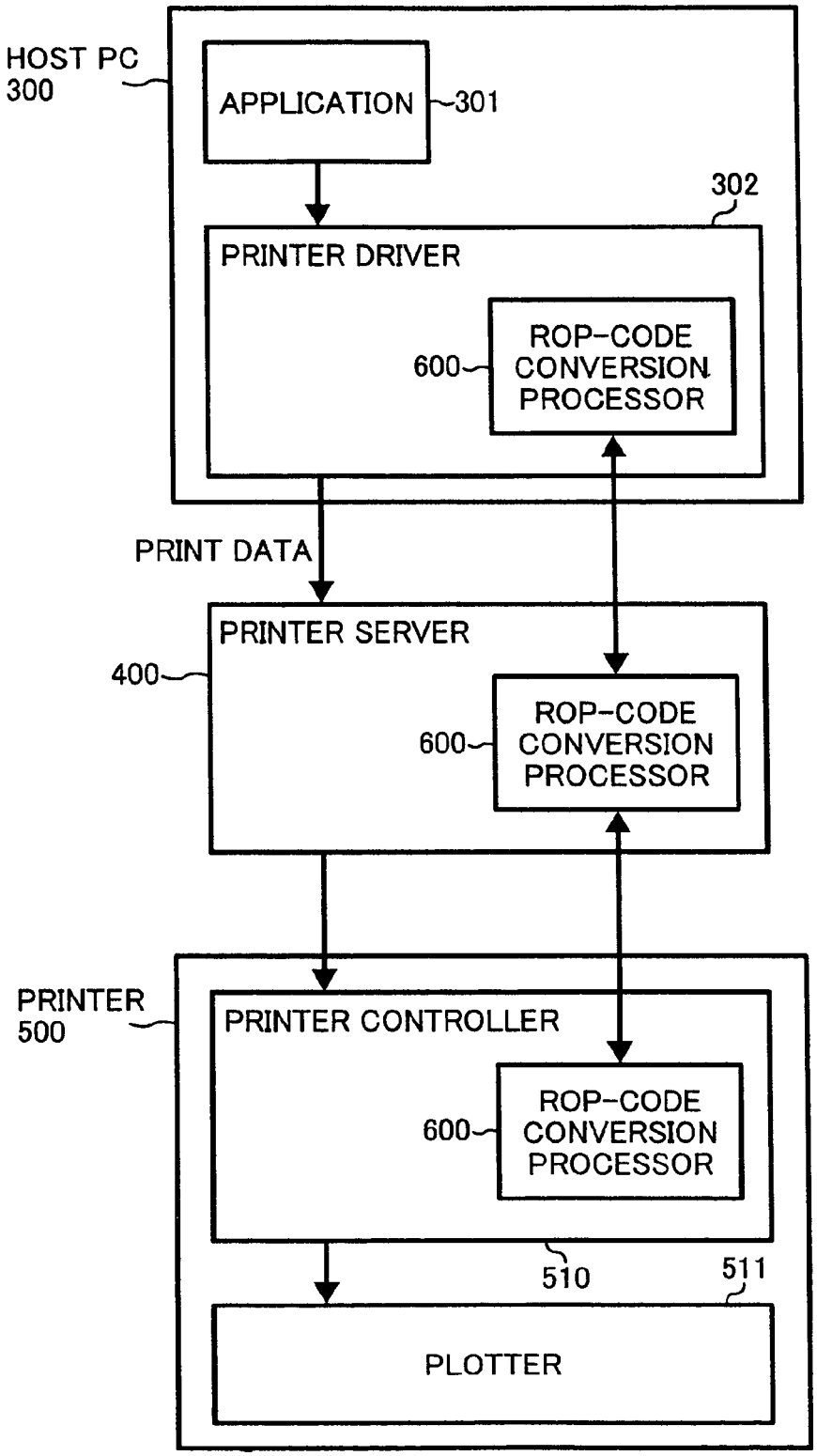
FIG. 7 is a configuration example of an image processing system according to a third embodiment of the present invention.

FIG. 7 is a configuration example of an image processing system according to a third embodiment of the present invention. In FIG. 7, reference numeral 300 denotes a host PC, 301 denotes an application installed in the host PC 300, 302 denotes a printer driver installed in the host PC 300, 400 denotes a printer server, 500 denotes a printer, 510 denotes a printer controller installed in the printer 500, and 511 denotes a plotter installed in the printer 500. In the third embodiment, a ROP-code conversion processor 600 that converts the ROP code and the ROP calculation rule is installed in the printer driver 302, the printer server 400, and the printer controller 510. The printer driver 302, the printer server 400, and the printer controller 510 perform the conversion of the ROP code and the ROP calculation rule in any one of processors on a transmission channel of print data according to a load and the like of each processor to improve the efficiency of the whole image processing system.

The image processing apparatus of the above embodiments can be applied to a system configured of a plurality of devices (for example, a host computer, an interface device, a scanner, a printer, and the like), and also be applied to a system configured of one device (such as a host computer).

An object of the above embodiments can be accomplished by providing a recording medium, in which a program code of software for implementing the function of the image processing apparatus is recorded, in a system or an apparatus, so that a computer (or a central processing unit (CPU), a micro processing unit (MPU), or a digital signal processor (DSP)) of the system or the apparatus executes the program code stored in the recording medium. In this case, the program code itself read out from the recording medium implements the function of the image processing apparatus, and the recording medium that stores the program code or the program configures the present invention. An optical recording medium, a magnetic recording medium, a magneto optical recording medium, and a semiconductor recording medium such as a floppy disk (FD), a hard disk, an optical disk, a compact disk read only memory (CD-ROM), a CD recordable (CD-R), a magnetic tape, a nonvolatile memory, and a ROM can be used for the recording medium for providing the program code.

Obviously, there is a case that the function of the image processing apparatus is implemented by executing the program code read out by the computer. Furthermore, there is another case that an operating system (OS) or the like running on the computer under the instruction of the program code executes a part of or all of the process to implement the function of the image processing apparatus.

There is still another case in which the program code read out from the recording medium is written into a memory provided in a function extension board inserted into a computer or a function extension unit connected to a computer, and subsequently, under the instruction of the program code, the CPU or the like provided in the function extension board and the function extension unit performs a part of or all of the actual process. This process enables implementation of the function of the image processing apparatus.

According to an aspect of the present invention, in the image processing apparatus that can process a plurality of printer languages having respectively different ROP calculation rules, and that inputs print data written in any one of the printer languages and performs rasterization into drawing data corresponding to the input print data, a converter converts a target ROP code and ROP calculation rule of the print data into another ROP code and ROP calculation rule that produce substantially the same drawing data. Therefore, in a configuration in which a plurality of printer languages can be processed, it becomes possible to provide an image processing apparatus, an image processing method, and an image processing program that can perform a fast ROP process with respect to the print data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that can process a plurality of printer languages having respectively different raster operation (ROP) calculation rules, and receiving an input print data written in any one of the printer languages and performs rasterization into drawing data corresponding to the input print data, the image processing apparatus comprising:
a converter that converts a target ROP code and ROP calculation rule of the input print data into another ROP code and ROP calculation rule that produce substantially same drawing data, and the converter performs the conversion when a process speed is increased if the another ROP code and ROP calculation rule are used.

2. The image processing apparatus according to claim 1, wherein the converter sets the ROP code and the ROP calculation rule by each drawing command, by each band, by each page, or by each job.

3. The image processing apparatus according to claim 1, wherein the converter performs the conversion by referring to a ROP conversion table.

4. The image processing apparatus according to claim 3, wherein the ROP conversion table includes at least an ROP code, an ROP calculation rule, and a drawing object as parameters.

5. The image processing apparatus according to claim 1, wherein the converter is installed in at least one of an image forming apparatus and an information processing apparatus.

6. The image processing apparatus according to claim 1, wherein the ROP calculation rules are any one of ROP2 to ROP4.

7. An image processing method of processing a plurality of printer languages having respectively different raster operation (ROP) calculation rules, and receives an input print data written in any one of the printer languages and performs rasterization into drawing data corresponding to the input print data, the image processing method comprising:
- converting a target ROP code and ROP calculation rule of the input print data into another ROP code and ROP calculation rule that produce substantially same drawing data; and
- performing the conversion when a process speed is increased if the another ROP code and ROP calculation rule are used.

8. A computer program product having a non-transitory computer-readable recording medium storing a plurality of instructions, that when the plurality of instructions are executed by a computer, cause the computer to process a plurality of printer languages having respectively different ROP calculation rules, inputting an input print data written in any one of the printer languages, and performing rasterization into drawing data corresponding to the input print data, the instructions causing the computer to execute:
- converting a target ROP code and ROP calculation rule of the input print data into another ROP code and ROP calculation rule that produce substantially same drawing data; and
- performing the conversion when a process speed is increased if the another ROP code and ROP calculation rule are used.

* * * * *